April 28, 1936.  H. J. HORN  2,038,842
BRAKE DRUM
Filed March 18, 1935  2 Sheets-Sheet 1

INVENTOR.
HARRY J. HORN.
BY Carroll R. Taber
ATTORNEY.

April 28, 1936.  H. J. HORN  2,038,842
BRAKE DRUM
Filed March 18, 1935  2 Sheets-Sheet 2

INVENTOR.
HARRY J. HORN.
BY
Carroll R. Taber
ATTORNEY.

Patented Apr. 28, 1936

2,038,842

UNITED STATES PATENT OFFICE 2,038,842

BRAKE DRUM

Harry J. Horn, Lansing, Mich., assignor to Motor Wheel Corporation, Lansing, Mich., a corporation of Michigan Application March 18, 1935, Serial No. 11,609

5 Claims. (Cl. 188—218)

This invention relates to brake drums and the method of producing the same, more particularly it relates to brake drums consisting of a brake ring and a supporting web therefor initially formed as separate parts and thereafter fastened together to provide a composite drum.

The principal object of the invention is to provide a composite brake drum with a minimum amount of material which may be quickly and economically produced and which has the necessary characteristics of dissipating heat rapidly and of resisting destruction when subjected to abnormal usage. The manner in which this and other objects as well as the advantages mentioned are obtained will more fully appear from the following description taken in connection with the drawings forming a part hereof.

In the drawings:

Figures 1 to 9 inclusive illustrate the various steps in the production of the brake drum web;

Figure 15:
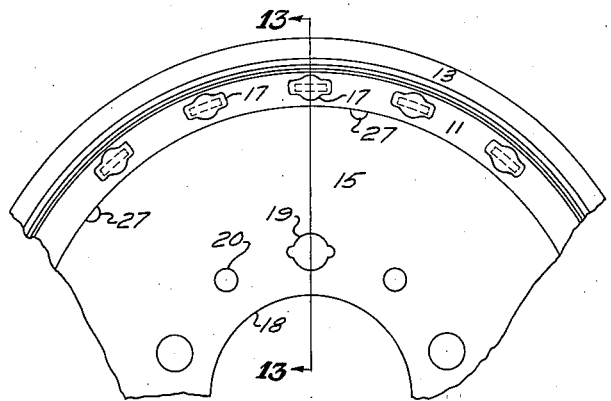
Figure 15 is a partial front view of the construction shown in Figure 13.
Figure 13:
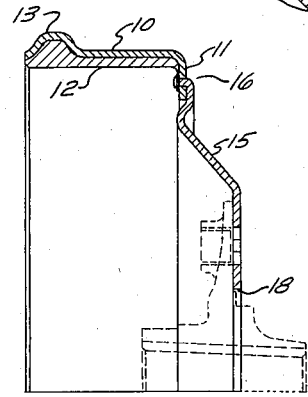
Figure 13 is a partial sectional view of a composite brake drum embodying the present invention taken on substantially the line 13—13 of Figure 15.
Figure 14:
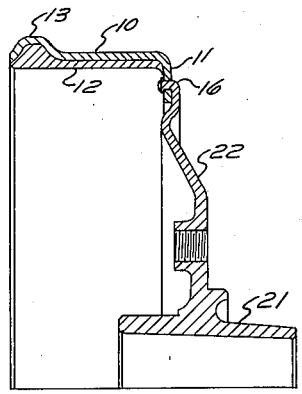
Figure 14 is a partial sectional view of a brake drum embodying a modified form of the invention.

A better understanding of the novel method of producing the present brake drum will be had by first referring to the illustration in Figures 13, 14, and 15, of the completed drum. Figures 13 and 15 show the preferred embodiment of the invention and Figure 14 a modified embodiment of the invention.

Figure 10:
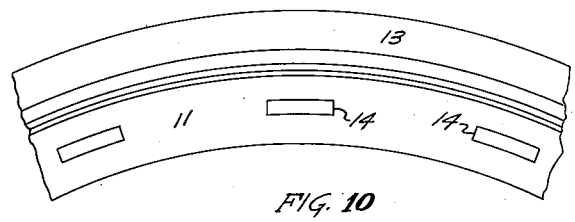
Figure 10 is a fragmentary front view of the brake ring prior to assembly with the web.

In Figures 13 and 14 the brake drum is shown as consisting of a brake ring 10 having an inturned flange 11 at one edge thereof. The brake ring is here shown as of the type having a wear-resisting inner liner 12. The external surface of the ring 10 is preferably deformed as indicated at 13 to provide a stiffening means adjacent the open side thereof. The flange 11 of ring 10 is provided with circumferentially spaced apart rectangular openings 14 which are clearly shown in Figure 10.

Figure 16:
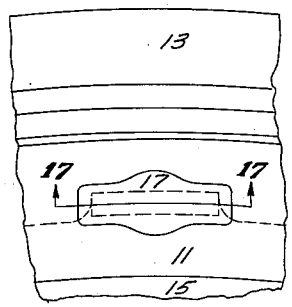
Figure 16 is an enlarged fragmentary view of the composite drum showing the relation of the projections carried by the web to the ring after assembly.
Figure 17:
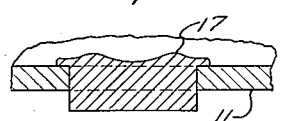
Figure 17 is a sectional view taken on substantially the line 17—17 of Figure 16.

The ring 10 is supported by a generally disk-like web 15. The web 15 is provided with a plurality of integral fingers 16 at its periphery (see Fig. 11). The fingers 15 are rectangular in cross section, the cross sectional area thereof being slightly less than the area of the openings 14. The fingers 16 project through the corresponding openings 14 in the ring flange 11 and have their free extremities enlarged as indicated at 17 in Figures 15, 16 and 17. The manner in which these extremities are enlarged to overlie the edges of the cooperating openings 14 will be described presently.

The web 15 is provided with a central opening 18 in order to mount the same over a wheel hub such as that shown in dotted lines in Figure 13. Adjacent the central opening 18 the web is provided with a series of relatively large holes 19 and an intermediate series of relatively smaller holes 20. The smaller holes 20 are utilized in attaching the web to a hub flange as by riveting and the larger holes 19 are aligned with corresponding holes in the hub flange and receive the securing studs by means of which a wheel may also be attached to the hub flange.

One of the distinct advantages of the present invention is the fact that an enlarged hub flange may be utilized as a support for the brake ring without the use of a separate supporting web. Such a construction is illustrated in Figure 14. As there shown a hub 21 is provided with an enlarged radial flange 22. The flange 22, as in the case of the web 15 just described, is provided at its periphery with a plurality of integral fingers 16. The connection between the hub flange 22 and the ring 10 is identical to that of the corresponding parts illustrated in Figure 13.

The ring 10 and the web 15 of the brake drum illustrated in Figures 13 and 15 are produced separately. The ring 10 is here shown as of the type preferably formed from strip stock rolled into a hoop and the ends welded together. The ring is formed with the flange 11 at one edge thereof and the flange is provided with the openings 14. The wear-resisting inner liner 12 may be of any desired material such as cast iron, for example, and may be secured to the ring by a centrifugal casting process.

Figure 1:
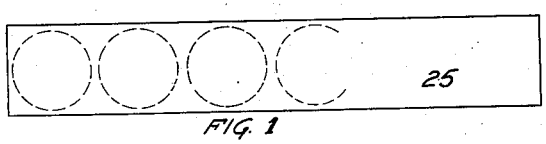
Figure 2:
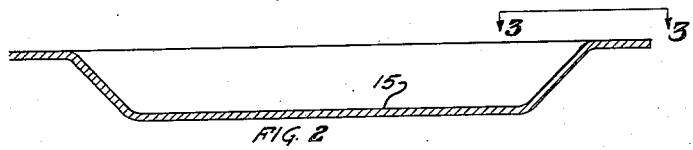
Figure 3:
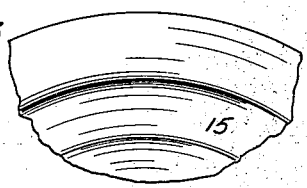
Figure 4:
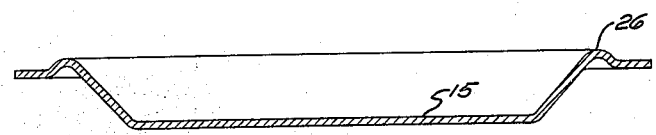
Figure 5:
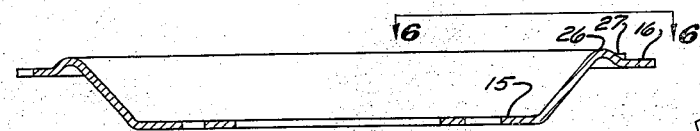
Figure 6:
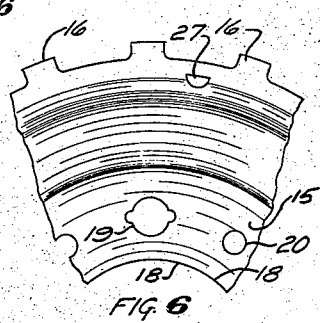
Figure 7:
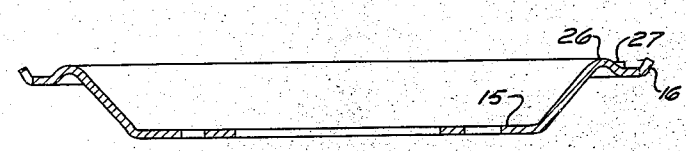

The formation of the web 15 is clearly shown in Figures 1 to 9 inclusive. As there shown, a plurality of disks may be cut from a rectangular blank 25. These disks are then subjected to a deforming operation by means of which the central portion thereof is dished as shown in Figure 2. The disk is next provided with the circumferential rib 26 by a suitable die-drawing operation. Thereafter portions of the periphery of the disk are cut away as shown in Figures 5 and 6 to provide the circumferentially spaced apart radially extending integral fingers 16. Preferably at the same time, the disk is pierced to form the opening 18, 19 and 20, and the supporting projections 27. These projections, as clearly shown in Figure 6, are located adjacent the periphery of the disk, preferably between the fingers 16, although the number of these projections is preferably less than the number of fingers.

Figure 8:
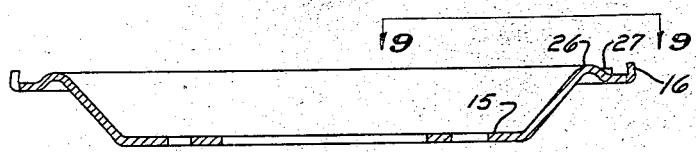
Figure 11:
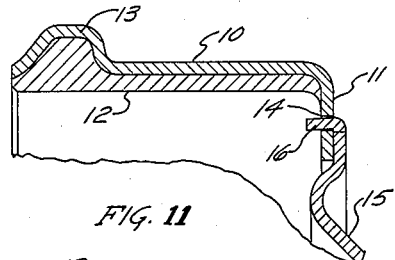
Figure 11 is a partial sectional view of the ring and web after assembly and before being fastened together.

The fingers 16 are bent laterally in order that they may project through the openings 14 in the flange 11 of ring 10 when the ring and web are assembled. As graphically illustrated in Figures 7 and 8 the bending of the fingers is accomplished in two separate operations. This is necessary in order to avoid hardening the fingers and thereby destroying their ductility with the result that difficulty would be experienced in deforming the same as hereinafter described. It has been found that the best results are obtained by bending the fingers at a point a slight distance outwardly from their base so that after they are bent the fingers project radially beyond the body of the web 15 a distance at least as great as their thickness. As best shown in Figures 8 and 11 the fingers 16 are bent laterally to a position where the free extremities are inclined radially inwardly to a slight extent.

Figure 9:
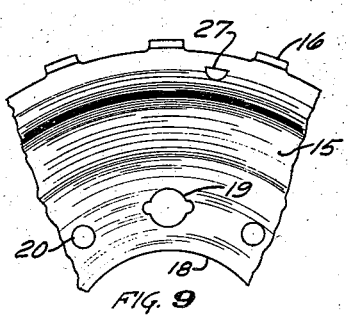

The web as shown in Figures 8 and 9 is ready for assembly with the brake ring. As previously mentioned, the fingers 16 are of the same shape as the openings 14, but the fingers are somewhat smaller than the openings. In assembling the web and ring the fingers 16 are inserted into the openings 14 as shown in Figure 11. As best shown in Figure 15 the projections 27 assist in centering the web and ring. The inner extremity of the flange 11 preferably contacts at least some of these projections. When assembled, as shown in Figure 11, the fingers 16 are positioned somewhat diagonally within the openings 14 with respect to the radial extent of the openings. This diagonal or inclined position of the fingers 16 in the openings 14 is of assistance in forming a proper connection between the ring and web.

Figure 12:
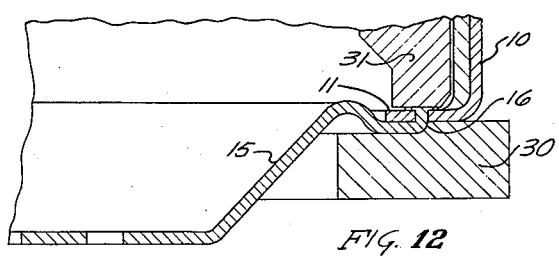
Figure 12 illustrates the manner in which the extremities of the integral projections of the web are enlarged to fasten the web and ring together.

The web and ring are permanently fastened to each other by enlarging the free extremities of fingers 16. This is done as illustrated in Figure 12. As there shown, the ring and web, in assembled relation, are supported by a fixture 30. This fixture supports the web against both radial and axial displacement. The extremities of the fingers 16 are enlarged by applying axial pressure against the ends of the fingers with a specially formed punch 31. By applying a true axial pressure to the ends of the fingers 16 the metal of the fingers is caused to flow axially to a sufficient extent to completely fill the openings 14 in the flange 11. This is desirable in order to prevent movement between the ring and web and also to provide for adequate heat transfer from the ring to the web.

The punch 31 is provided with a special contour in order to cause the metal of the fingers 16, at the ends thereof, to flow laterally as well as endwise. This is necessary because of the rectangular cross section of the fingers 16 and because it is desired to enlarge the ends of fingers 16 sufficiently to completely overlie the edges of the openings 14 through which the fingers extend. The manner and extent of the enlargement of the finger ends is clearly shown at 17 in Figures 16 and 17. As there shown it is apparent that the enlarged ends 17 contact the surface of flange 11 surrounding the openings 14. This contact also aids in the transfer of heat from the ring to the web.

By making the web 15 with an overall diameter less than the diameter of the brake ring a considerable saving in material results. By utilizing the integral fingers 16 for fastening the web and ring together the number of parts employed is maintained at a minimum and at the same time a very efficient heat transferring connection is provided. The manner in which the ends of fingers 16 are enlarged insures a secure connection between the web and ring and one which will withstand without destruction or distortion any use to which the drum is usually subjected. All these advantages are obtained at a minimum of expense.

The scope of the invention, which may be embodied in modifications other than those shown and described, is indicated in the appended claims.

I claim:—

1. A brake drum comprising a brake ring having an inwardly extending flange provided with a plurality of apertures and a disc-like web having a circumferential rib adjacent the inner periphery of said flange and an annular portion contacting said flange, said web being provided with integral fingers extending beyond the periphery of said web and extending through said apertures, said fingers being enlarged at their extremities to secure said web to said flange.

2. A brake drum comprising a brake ring having a radially extending flange provided with circumferentially spaced apertures and a disc-like web of a diameter locating its periphery radially inwardly of said apertures, the web having integral fingers at its periphery extending through the apertures in the flange, the free ends of the fingers being enlarged to secure the web to the flange.

3. A brake drum comprising a brake ring having a radial flange at one edge thereof provided with spaced apertures and a disc-like supporting web for the ring disposed with its radially inner and outer peripheries located at one side of the plane of the flange and with an intermediate portion extending into the plane of the flange, the web having a diameter less than that of the flange and provided with integral fingers at its periphery extending through the apertures in the flange, the free ends of the fingers being enlarged to secure the web to the flange.

4. A brake drum comprising a brake ring having a radial flange provided with spaced apertures and a disc-like supporting web having a peripheral portion contacting a relatively small area of one side of the flange and a portion located radially inwardly of its periphery extending into the plane of the flange, the web having integral fingers at its periphery extending through the apertures in the flange, the free ends of the fingers being enlarged to secure the web to the flange.

5. A brake drum comprising a brake ring having an inwardly extending flange provided with spaced apertures and a dished supporting web having integral fingers extending beyond its periphery and through said apertures, the free ends of the fingers being enlarged to secure the web to the flange, the dishing of the web being such that the web crosses the central plane of the flange at least once.

HARRY J. HORN.